United States Patent [19]

Karnowski et al.

[11] Patent Number: 5,606,598

[45] Date of Patent: Feb. 25, 1997

[54] TELEPHONE ANSWERING DEVICE WITH DIRECT TELEPHONE LINE INTERFACE

[75] Inventors: Mark J. Karnowski, Garden Grove; Stephen B. Knuth, Mission Viejo, both of Calif.

[73] Assignee: Casio PhoneMate, Inc., Torrance, Calif.

[21] Appl. No.: 980,744

[22] Filed: Nov. 24, 1992

[51] Int. Cl.⁶ .................................. H04M 1/64; H04M 1/00
[52] U.S. Cl. ................................ 379/79; 379/72; 379/412; 379/437
[58] Field of Search ................................ 379/70, 68, 79, 379/80, 81, 82, 83, 307, 399, 412, 413, 419, 441, 437, 440, 428, 442, 67, 88, 89, 74, 438; 360/90, 96.5, 124, 127, 129; 361/212, 220, 779

[56] References Cited

U.S. PATENT DOCUMENTS

| | | | |
|---|---|---|---|
| 3,649,762 | 3/1972 | Okamura | 379/82 |
| 3,881,187 | 4/1975 | Nakamichi | 360/129 |
| 4,005,270 | 1/1977 | Darwood | 379/77 |
| 4,119,801 | 10/1978 | Jacobson | 379/79 |
| 4,139,875 | 2/1979 | Tatara et al. | 360/94 |
| 4,317,149 | 2/1982 | Elser et al. | 360/126 |
| 4,390,752 | 6/1983 | Jacobson | 379/82 |
| 4,451,707 | 5/1984 | Hanscom | 379/82 |
| 4,484,036 | 11/1984 | Lyle et al. | 379/351 |
| 4,499,335 | 2/1985 | Lyle et al. | 379/70 |
| 4,689,813 | 8/1987 | Pleska et al. | 379/70 |
| 4,700,634 | 10/1987 | Mills et al. | 108/43 |
| 4,739,431 | 4/1988 | Yasuda et al. | 360/126 |
| 4,818,237 | 4/1989 | Weber | 439/693 |
| 5,001,743 | 3/1991 | Lenaerts | 379/82 |
| 5,050,211 | 9/1991 | Dortu et al. | 379/438 |
| 5,160,879 | 11/1992 | Tortola et al. | 320/2 |
| 5,193,707 | 3/1993 | Mizumura | 220/326 |
| 5,278,896 | 1/1994 | Sakata et al. | 379/70 |
| 5,392,332 | 2/1995 | Core et al. | 379/67 |
| 5,418,841 | 5/1995 | Hareaguchi et al. | 379/70 |

FOREIGN PATENT DOCUMENTS

| | | | |
|---|---|---|---|
| 0169259 | 9/1985 | Japan | 379/70 |
| 0159852 | 7/1986 | Japan | 379/70 |
| 0305252 | 12/1990 | Japan | 379/438 |

OTHER PUBLICATIONS

Publication From Underwriters Laboratory (UL–1459), pp. 17–19, Dec. 1987.
"Telephone Answering Machines", Modern Electronics, Apr. 1990 pp. 46–49.
Phone Mate 8400, Instruction/Owner's Manual, date unknown.
"GE Telephone Compact Beeperless Answering System, Model 2–9860, Use one Core Guide", pp. 2–7, 18–19, 1990.
Publication from Underwriters Laboratory, Inc. (UL–1459) Replacement pp. 17, 18 and 19 dated Dec. 18, 1987 (Mar. 8, 1991).
"Elements of Electromagnetics", Matthew N. O. Sadiku, p. 750. Dec. 1989.
"Webster's II new Riverside university dictionary", Houghton Mifflin Company, p. 1000. Dec. 1984.

*Primary Examiner*—Ahmad F. Matar
*Assistant Examiner*—Scott L. Weaver
*Attorney, Agent, or Firm*—Frishauf, Holtz, Goodman, Langer & Chick

[57] ABSTRACT

A telephone answering device with a direct telephone line connection eliminates the need for a transformer, optoisolators and relays that are normally used in telephone answering devices to isolate the telephone answering device system from the central office circuit. Isolation is instead achieved directly at the exposed metal points of the system by physical isolation, switched isolation, resistive isolation and dielectric isolation.

37 Claims, 6 Drawing Sheets

TELEPHONE ANSWERING DEVICE WITH DIRECT TELEPHONE LINE INTERFACE

BACKGROUND OF THE INVENTION

The present invention is directed to a telephone answering device (TAD), and more specifically to a telephone answering device which directly connects with the telephone lines and which eliminates the need for bulky and expensive isolation elements such as transformers, optoisolators and relays which are normally used to isolate the telephone answering device from the central office circuit equipment.

It is a common practice in the design of telephone answering devices (TADs) to isolate the TAD system from the central office circuitry by employing transformers, electromechanical relays and optoisolators. The objective is not only to avoid crosstalk between adjacent lines as required by the FCC, but also to eliminate shock hazards. It therefore has been common practice to design the various circuits which interface to the telephone line, such as the line sense, ring detect and CPC (i.e., calling party control) detect circuitries as well as the voice path, so as to provide a high degree of isolation.

In the prior art, attempts have been made to reduce or simplify some of the circuitry, but no fully effective isolation system has been achieved without a transformer. The reason is that in tape based telephone answering devices (TADs), the metal shields of the tape heads are electrically connected to the chassis common for noise prevention. The tape heads are accessible to the user in order to replace the tapes. The telephone line typically carries a 50 volt DC potential (and can also carry voltages as high as 150 volts RMS while ringing) that poses a shock hazard to the user. In U.S. Pat. No. 4,390,752 a single transformer is used both to couple the audio to and from the telephone line and to also serve as a coupling device for ring detection. However, the complete elimination of the transformer is not achieved in U.S. Pat. No. 4,390,752.

As used herein, the term "chassis common" is used to indicate a conducting connection to a chassis or frame, or equivalent chassis connection of a printed-circuit board. The chassis or frame (or common connection) may be at a substantial potential with respect to earth or ground potential. The term "ground" is used to designate a conducting connection by which an electrical circuit or equipment is connected to the earth.

OBJECTS OF THE INVENTION

It is an object of the present invention to provide a telephone answering device (TAD) that can be coupled directly to the telephone lines (and consequently directly to the central office circuit) without requiring additional electrical isolation components at the telephone line connection.

It is another object of the present invention to provide electrical isolation directly at exposed metal parts of the TAD.

It is yet another object of the present invention to provide the electrical isolation of the TAD without using isolating elements such as transformers, relays and optoisolators.

It is also an object of the present invention to substitute the expensive circuit elements normally used for electrical isolation with more cost effective means such as physical isolation, switched isolation, resistive isolation and dielectric isolation.

It is still another object of the present invention to employ those circuit elements for electrical isolation that lend themselves for easy incorporation into an integrated circuit.

These and other objects of the invention will become apparent from the following specification.

SUMMARY OF THE INVENTION

According to the present invention, a telephone answering device has metallic members connected to chassis common potential. The telephone answering device comprising a power source for supplying electrical power to the telephone answering device; message recording and playback means for recording a message and for playing back a message; and a line interface circuit with direct transformerless connection to a telephone line. Control means is provided for controlling the message recording and playback means. Isolation means is provided for electrically isolating a user from contact with internal circuitry and chassis common-connected metallic members of the telephone answering device.

Preferably, the isolation means also includes means for isolating the incoming telephone line from ground potential.

In the case where the message recording and playback means comprises a tape recorder mechanism including a tape head having a metal casing and a magnetic member therein, the isolation means may comprise a high impedance resistance member coupling said metal casing of said tape head to chassis common potential. The isolation means may also include a dielectric material in the metal casing of the tape head for electrically isolating the magnetic member in the tape head from the tape head casing. Switch-operated electrical isolation of the tape head casing may also be used.

DETAILED DESCRIPTION

Telephone answering devices (TADs) have always been designed to be electrically isolated from the telephone line. This was due to the Longitudinal Balance requirements of FCC part 68. These tests require that the telephone line be isolated from ground (earth) to avoid crosstalk between adjacent lines. Since Longitudinal Balance testing procedures dictate that all exposed metal be connected to ground (earth), it was necessary to isolate the incoming telephone line from these exposed metal parts.

Also, hazardous voltages exist on the telephone line, particularly while a ring is present. If the TAD system were not isolated from the telephone line, there would be a danger of shock anytime the user would touch an exposed metal surface of the TAD, such as a tape head, or a battery terminal.

To solve the above-mentioned problems, traditional TAD design uses isolating elements such as transformers, relays and optoisolators to couple the circuitry of the TAD to the telephone line. Unfortunately, these kinds of circuit isolation elements are costly and/or bulky, and it is not possible to fabricate these circuit isolation elements into an integrated circuit.

The present invention departs from traditional TAD design by not isolating at the telephone line, but by providing electrical isolation directly at the exposed metal points of the TAD unit. The isolation in the present invention is not performed by expensive circuit elements, but by more cost effective means such as physical isolation of specific parts, switched isolation, resistive isolation, and dielectric isolation.

Figure 1:
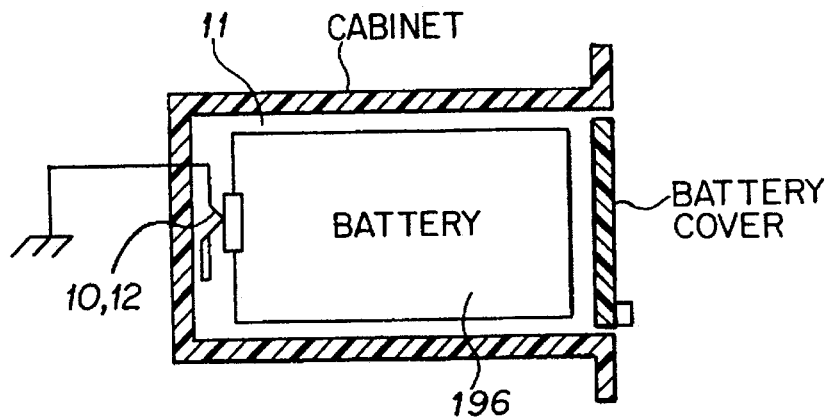
FIG. 1 is a schematic drawing showing a battery compartment providing electrical isolation from a user, for use in the telephone answering device (TAD) of the present invention.
Figure 1A:
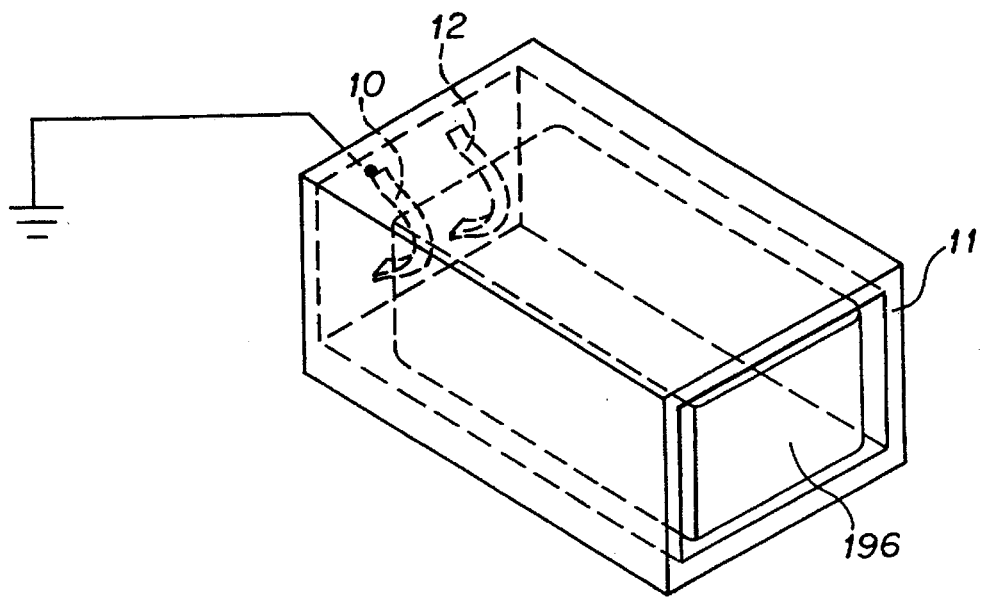
FIG. 1A shows the battery compartment with recessed terminals in greater detail.

Physical isolation according to the present invention avoids the problem of exposed metal by recessing or covering exposed metal parts to provide physical isolation of such parts. This can be done at little or no cost by incorporating the physical electrical isolation members, which cover metal parts, into the design of an injection-molded plastic cabinet. For example, as shown in FIGS. 1 and 1A, a battery terminal 10, which is connected to chassis common, can be recessed deeply in a battery compartment 11 so that it is not possible for the user to touch same. The other battery terminal 12 is preferably likewise deeply recessed. Similarly, metal parts of a microphone jack or a tape head are also physically isolated by recessing them or by covering them with insulating material such as plastic portions of the molded plastic cabinet or housing, as will be described in detail hereinbelow.

Figure 2:
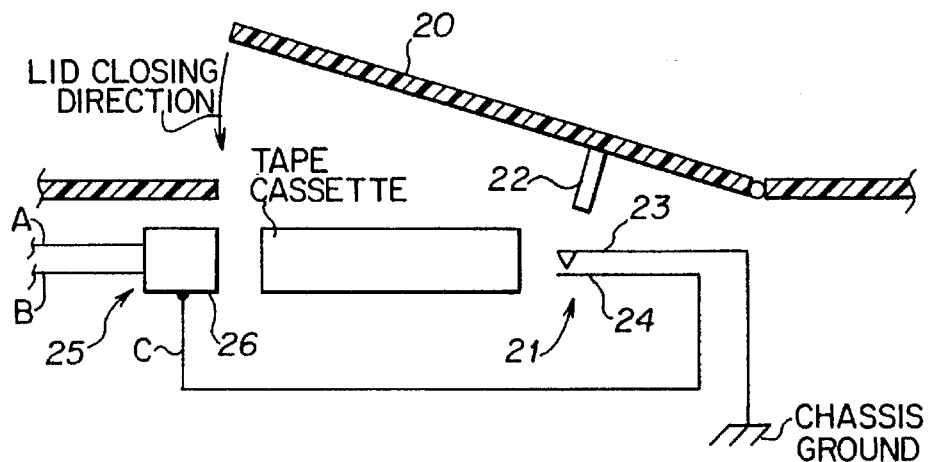
FIG. 2 is a schematic illustration of a tape cassette lid-operated switch for isolating a magnetic tape head from the electrical system of the TAD when the tape cassette lid is lifted or opened.

Switched isolation according to the present invention involves operating a switch to disconnect an exposed metal part of the TAD from chassis common when the user opens a door or lid of the TAD. For example, as shown in FIG. 2, when a cassette lid 20 of a TAD is opened by the user, a leaf switch 21, coupled to the cassette lid 20 by means of an operating projection or actuator rib 22, is opened to disconnect the metal housing or casing 26 of the magnetic tape head 25 from the chassis common of the TAD, thereby electrically isolating the metal cased tape head 25 from the telephone line. The construction of the magnetic tape head 25 is shown in greater detail in FIG. 3. The electrical lead C, connected to the metal casing 26 of the magnetic tape head 25, is, as shown in FIG. 2, connected to chassis common potential via a leaf switch 21. When the cassette lid 20 is closed, the actuator rib 22 presses on the upper springy contact 23 of leaf switch 21 so as to cause contact 23 to electrically contact with fixed contact 24 of the leaf switch 21, thereby connecting the metal case 26 of the tape head 25 to chassis common potential via the lead C and switch 21. When the cassette lid 20 is opened, as shown in FIG. 2, the actuator rib 22 is separated from the switch 21, thereby causing the springy leaf spring member 23 to spring upwardly away from fixed contact 24, to break the chassis common connection for the casing 26 of the magnetic tape head 25, thereby isolating the metal casing 26 of the tape head 25 from chassis common and from the telephone line when the cassette lid 20 is opened.

Figure 6:
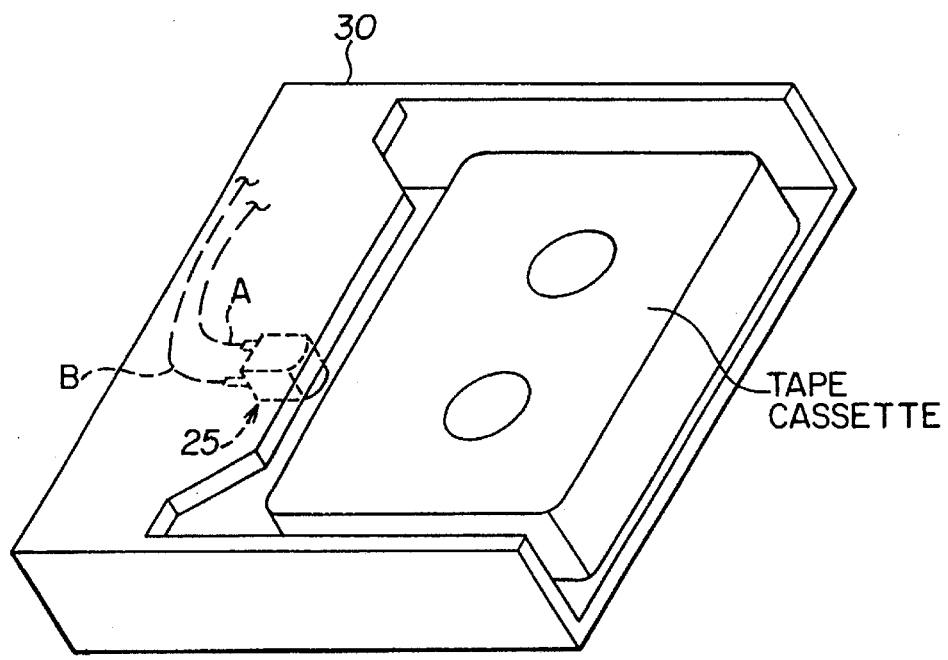
FIG. 6 illustrates in greater detail how the molded plastic cabinet of the TAD covers the exposed soldered connections to the magnetic tape head to isolate same from a user.

FIG. 6 shows a portion of the housing or cabinet of the TAD 11 which surrounds the tape cassette and the magnetic tape head 25. As shown in FIG. 6, the magnetic tape head 25 is recessed deeply in the housing so as to prevent access by a user, thereby effectively isolating the tape and its soldered electrical connections head from contact with a finger of the user. This covering of exposed soldered connections to the tape head increases safety to the user and also further increases isolation from the telephone line. The openable cassette lid 20 of FIG. 2 closes the upper opening of the cabinet over the tape cassette, which opening is seen in FIG. 6. The lid 20 is not shown in FIG. 6.

While a leaf switch 21 is shown in FIG. 2, any suitable switch, actuated by opening of the cassette lid 20, could be used.

Figure 3:
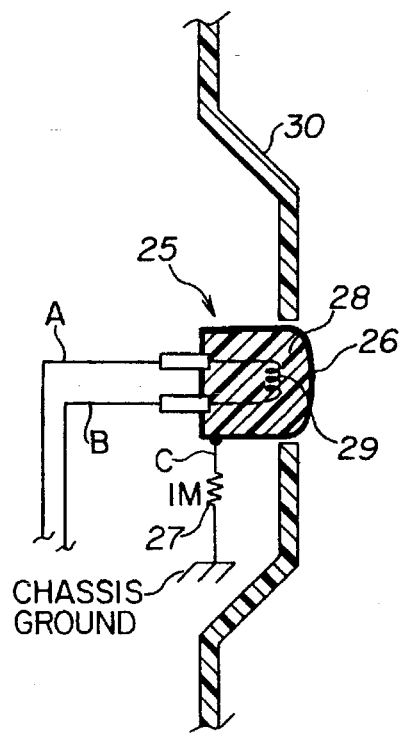
FIG. 3 shows dielectric electrical isolation of a magnetic tape head in accordance with the present invention.

Resistive and dielectric isolation use the resistance to current flow to provide electrical isolation. An example of this technique is shown in FIG. 3. Typically, the metal casing 26 of a magnetic tape head 25 is connected to the chassis common of the unit (see FIG. 2). This is done to avoid buildup of static electricity that can cause noise problems on the tape. As shown in FIG. 3, by using a high-valued resistor 27 (for example 1 Megohm) in the path of this chassis common connection circuit, static electricity is dissipated and current flow is reduced enough to avoid a shock hazard to a user. The resistor 27 of FIG. 3 essentially replaces the leaf switch 21 of FIG. 2. However, both could be used together in series.

FIG. 3 also shows an example of dielectric isolation which is used in combination with the switch 21 and/or resistor 27. The signal path to the tape head (i.e., leads A and B) cannot be isolated by resistive isolation; it is a low impedance path that would not record an adequate signal on the tape if coupled through a large resistance. Through the use of a dielectric material 28 inside the tape head casing 26, the metal casing 26 of the tape head 25 is isolated from the signal path (leads A and B) and the coil 29 of the tape head. The soldered connections to the signal path leads A and B are physically isolated by the plastic cabinet 30 of the TAD, as seen also in FIG. 6.

Figure 4:
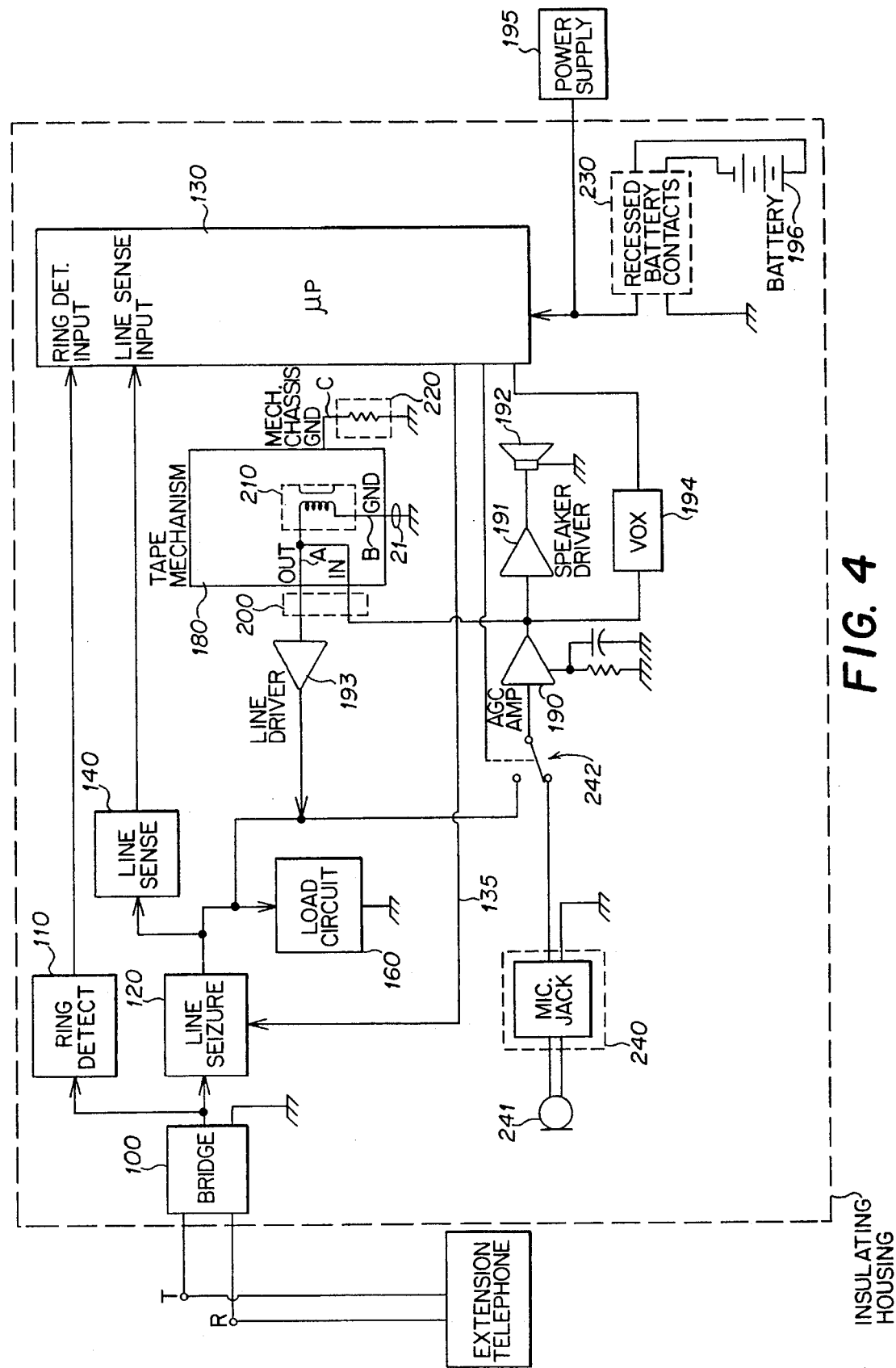
FIG. 4 is a schematic block diagram of a preferred embodiment of the present invention.

A preferred embodiment of a TAD is shown in FIG. 4. The schematic shown in FIG. 4 is a typical TAD employing direct connection to the telephone line (T and R). Starting at the telephone line, the T and R (Tip and Ring) lines are coupled to the TAD unit through a full wave bridge rectifier 100. This ensures that the TAD sees the same signal regardless of the polarity of the signal on the T and R lines.

The output of the bridge rectifier 100 is connected to the ring detect circuit 110 and the line seizure circuit 120. The output of the ring detect circuit 110 is fed to a microcontroller (microprocessor) 130, which interprets the signal to validate the ring. The line seizure circuit 120 is controlled by the microcontroller 130 via line 135 to perform a switching function which, when activated, will cause the TAD unit to capture the telephone line.

The line seizure circuit 120 is also connected to the line sense circuit 140 and to the load circuit 160. The line sense circuit 140 senses the DC voltage drop on the telephone line that occurs when an extension telephone is picked up and generates an output signal. The microcontroller 130 interprets this output signal from the line sense circuit 140 and will stop the announce/record cycle of the TAD when a call is manually answered after the TAD has responded to the call.

The load circuit 160 provides a DC load of less than 300 ohms and an AC load of 600 ohms. This allows enough DC loop current to flow, allowing the Telephone Company Central Office equipment to detect the seized line. The AC load matches the characteristic impedance of the telephone line to avoid signal reflection problems.

The electrical isolation elements of the present invention are schematically indicated by dashed line boxes 200, 210, 220, 230 and 240 in FIG. 4. As described in the examples above, the tape head mechanism of the TAD can be isolated in three ways: the signal wires A and B use physical isolation for the soldered connections (FIGS. 2 and 6); and dielectric isolation 28 for the coil 29 of the tape head 25 (FIG. 3); and resistive isolation 27 of the chassis common from the tape head (FIG. 3). The three isolation techniques can be used individually, or can be combined in any combination. They are not mutually exclusive. The microphone jack, AC adapter jack and the battery connections use physical isolation (FIGS. 1 and 1A) to recess or cover any metallic contacts so that the user cannot touch them. Physical isolation of the microphone and AC adapter jacks will be described later hereinbelow.

Box 200 of FIG. 4 represents the physical isolation shown by the insulating housing 30 of the TAD in FIGS. 3 and 6. The box 200 schematically represents the molded plastic cabinet portion 30 of the TAD which covers (isolates) the otherwise exposed soldered connections to the tape head.

The rest of the TAD follows the traditional design approach. An automatic gain control (AGC) amplifier 190 is provided for amplifying a signal from either the microphone or the telephone line. A tape mechanism 180, controlled by the microcontroller 130, is provided for recording and playing back the audio signal. A speaker driver 191 is connected to amplifier 190 and drives a built-in speaker 192. A line driver 193 sends an audio signal into the telephone line; and a vox circuit 194 informs the microcontroller 130 when a caller has stopped speaking. A power supply 195 with battery backup 196 supplies power to the TAD unit. The power supply 195 usually takes the form of an external AC adaptor which plugs into a jack on the housing of the TAD. For protection, the jack for the AC adaptor is preferably recessed, as will be described hereinbelow. The recessed battery contacts shown by the dashed line block 230 in FIG. 4 corresponds to the recessed battery contacts described above with respect to FIGS. 1 and 1A. These contacts are shown schematically by the block 230 in FIG. 4. The backup battery 196 is shown in its physical orientation in FIGS. 1 and 1A.

The switch 242 is a line/microphone switch which is controlled by the microcontroller 130 to allow recording from either of the input sources—that is, from either the microphone connected to the microphone jack 240 for recording a greeting or the like, or to the telephone line for recording incoming messages. Switch 242 is usually an analog switch.

Figure 5:
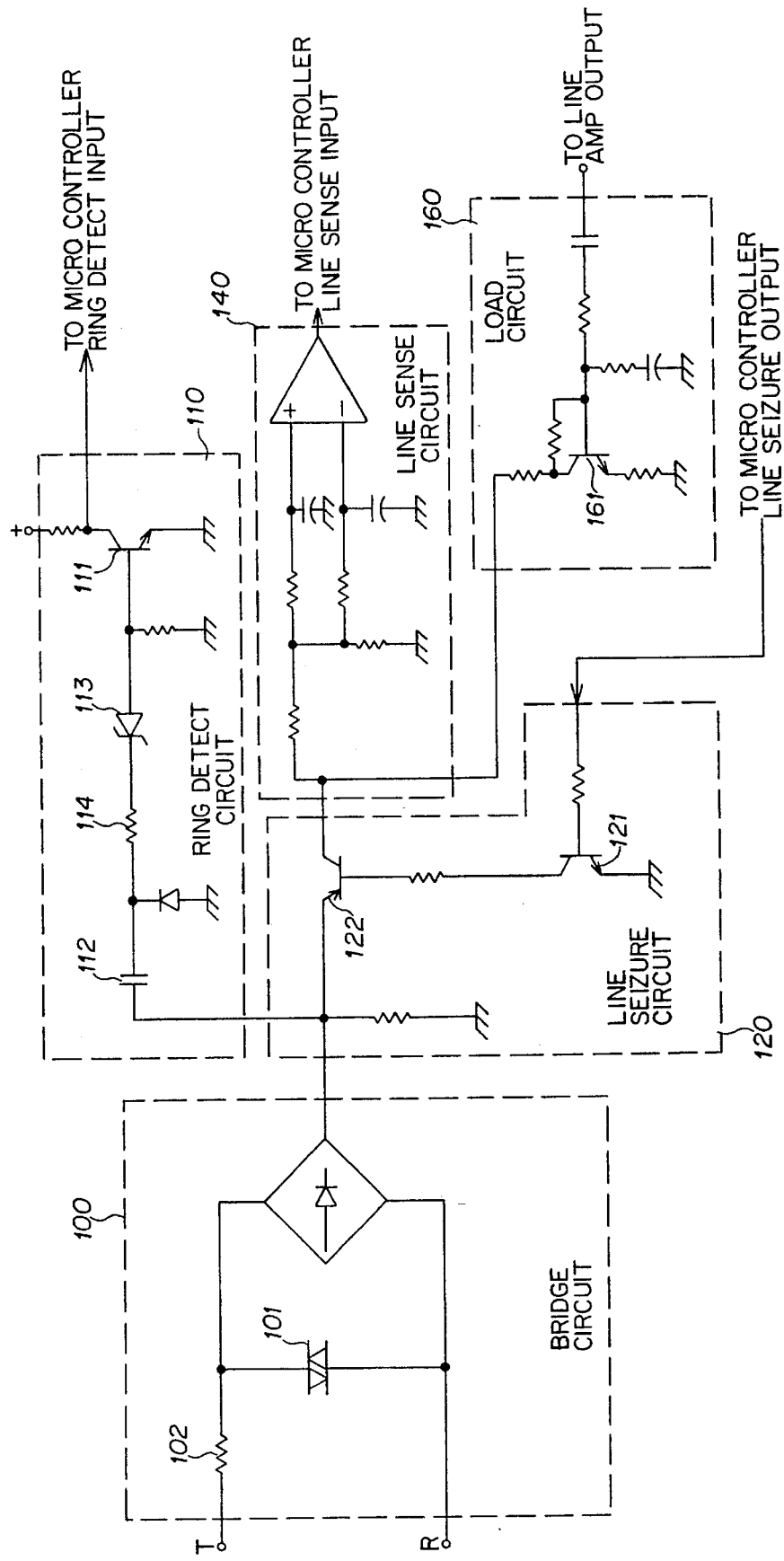
FIG. 5 is more detailed circuit diagram of portions of the schematic block diagram of FIG. 4, showing preferred embodiments.

FIG. 5 shows a more detailed schematic of the bridge rectifier circuit 100, line seizure circuit 120, ring detect circuit 110, line sense circuit 140 and load circuit 160. From the following description of each of these circuits, it can be easily seen that the direct connect approach of the present invention, for providing electrical isolation of the TAD which is connected directly to the telephone lines, is much more cost effective than traditional approaches.

As shown in FIG. 5, the bridge rectifier circuit 100 includes a surge absorber 101 and fusible resistor 102 to protect the TAD against transients in the telephone line.

The line seizure circuit 120 controls the on hook/off hook status of the TAD. When the microprocessor output goes high, the NPN transistor 121 turns on, drawing current through the base-emitter junction of the PNP transistor 122. A traditional approach would use a relay or high voltage optoisolator for this purpose, which components are substantially more expensive than a pair of transistors 121, 122, as used in the present invention.

The ring detect circuit 110 is a single transistor device comprising a single transistor 111. The rectified ring signal output from bridge rectifier circuit 100 is capacitively coupled through a capacitor 112 and a Zener diode 113 and resistor 114 to the transistor 111. If the ring signal is high enough to cause the zener diode 113 to conduct, the transistor 111 will be switched on and off with each half cycle of the ring signal. The microprocessor 130 interprets this signal to detect only valid rings. Traditionally, a more expensive optoisolator would be used in place of the single transistor 111.

The line sense circuit 140 is basically a self-biasing comparator that charges a capacitor to "remember" the line voltage, and compares that voltage to an instantaneous line voltage. When a telephone goes off hook on the same telephone line, the resulting drop in line voltage will be detected by the microprocessor 130. Traditional approaches, such as that shown in U.S. Pat. No. 4,451,707 to Hanscom, use a high impedance differential amplifier, followed by several other stages to perform the same function. The direct connect approach of the present invention makes it possible to eliminate all but the last stage of the Hanscom circuit.

The load circuit 160 replaces the transformer that exists in traditional TAD designs. Load circuit 160 comprises a transistor load 161 that is less than 300 ohms for DC and 600 ohms for audio signals.

Figure 7:
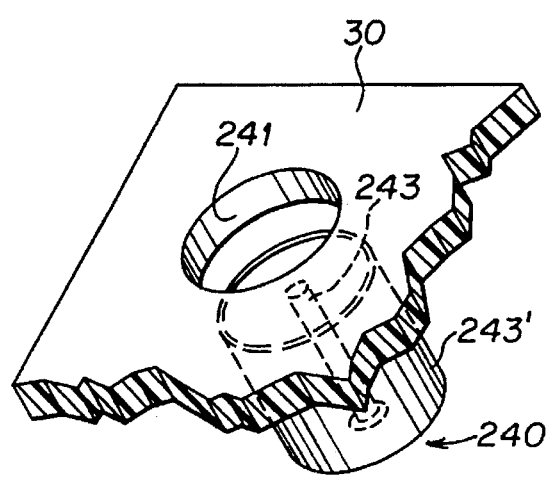
FIG. 7 shows in greater detail the jack isolation technique of the present invention.

FIG. 7 illustrates a technique for recessing a microphone jack 240 of FIG. 4, and for also recessing a jack for use in connecting an external power supply 195 (AC adaptor) to the TAD. As shown in FIG. 7, the plastic molded housing or casing 30 of the TAD has an opening 241 therein, through which a plug of a microphone or AC adaptor is insertable. Recessed deeply below the opening 241 is a jack mechanism 240 (which is conventional) which receives the microphone plug or AC adaptor plug. The jack 240 is mounted so as to be recessed sufficiently so that it is inaccessible to the fingers of a user, thereby providing physical isolation. The jack 240 is usually mounted on the back of the TAD. The jack 240 has metallic portions, for example its central pin 243 and its outer surrounding housing member 243', which are thus sufficiently recessed so as to prevent contact by a user.

Figure 8:
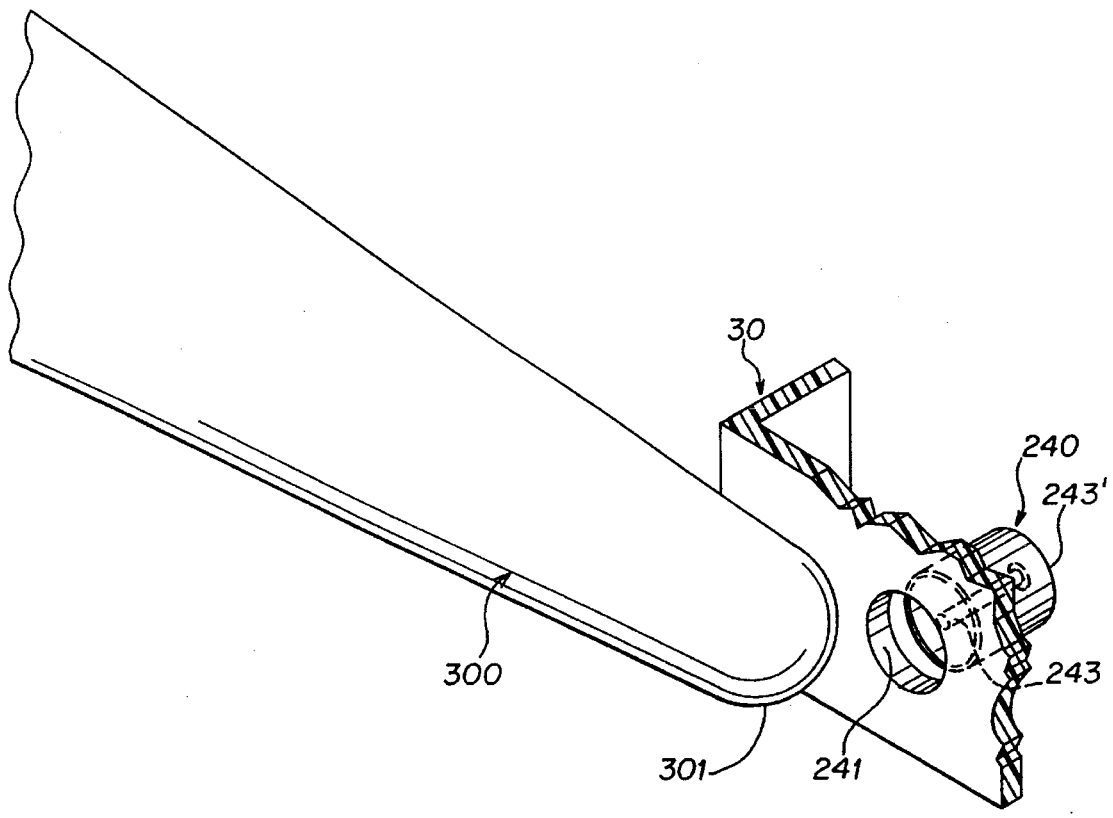
FIG. 8 shows how a UL test is conducted to determine inaccessibility of component parts.

With respect to the physical isolation techniques of the present invention, as shown in FIGS. 1, 1A, 6 and 7, these techniques are sufficient to prevent accidental contact with the respective metal mechanical portions of the TAD, and comply with the specifications of the Underwriters Lab (UL), Section UL 1459, that relates to accessibility of components in telephone equipment. As shown in FIG. 8, the UL test uses a probe 300, with a rounded probe tip 301, to determine if a metal part of telephone equipment is accessible. In order to conduct the UL test, the probe 300, with its rounded probe tip 301 having a radius of 6.35 mm, is placed adjacent the opening of the housing 30. Since the opening 241 has a diameter of about 5 mm in a preferred embodiment, the probe tip 301 cannot enter into the opening 241 and cannot contact the metal parts 243, 243' of the jack 240. Thus, the metal parts in the present invention are deemed inaccessible according to the UL test.

The probe, as shown generally in FIG. 8, tapers to a 6.35 mm radius at its tip end portion from its larger diameter portions. The battery compartment of FIGS. 1 and 1A is dimensioned such that the probe 300 of FIG. 8 (defined by UL section 1459), when inserted into the battery-receiving opening (after removal of the battery cover), cannot reach deeply enough into the battery compartment to contact the battery contacts 10, 12 which are located at the bottom wall of the battery compartment which is most remote from the opening of the battery compartment. The smallest dimension of the opening to the jack is sufficiently small to prevent entry of the probe 300 to a sufficient depth to contact the terminals at the bottom of the battery compartment. The configuration of the present invention can be suitably designed or modified to comply with any other physical isolation requirements of the UL or any other regulatory body, without departing from the inventive concept.

As should be apparent, substantially all of the electronic members of the present invention can be included in an integrated circuit, thereby simplifying production, simplifying assembly and reducing cost. This advantage is achieved by the transformerless circuit arrangement of the present invention which enables direct connection to the telephone line without requiring bulky, expensive and non-integratable isolation elements such as transformers, optoisolators and relays, used in conventional systems.

While particular embodiments of the invention have been shown and described, various modifications may be made. Moreover, various aspects and features of the present invention, disclosed hereinabove, can be used in any combination, and various modifications can be made within the scope of the following claims.

What is claimed is:

1. A telephone answering device comprising:

a power source for supplying electrical power to the telephone answering device, said power source comprising at least a user-replaceable battery which is connectable with battery terminals in an electrically insulating housing of said telephone answering device, one of said battery terminals being connected to chassis common ground, and said battery terminals being located in a recess which is arranged within an interior portion of said electrically insulating housing;

a message recording and playback unit, in said electrically insulating housing, for recording a message and for playing back a message, said message recording and playback unit comprising a tape recorder unit;

a line interface circuit in said electrically insulating housing, with direct transformerless connection to a telephone line; and a controller, in said electrically insulating housing, for controlling said message recording and playback unit; and wherein said tape recorder unit includes a tape head having a metal casing and a magnetic member therein, and a high resistance member coupling said metal casing of said tape head to chassis common ground.

2. The telephone answering device of claim 1, wherein said tape head further includes dielectric means of sufficient magnitude between said metal casing of said tape head and said magnetic member for electrically isolating said magnetic member in said tape head from said metal casing of said tape head.

3. The telephone answering device of claim 1, further comprising a jack having at least a member made of metallic material and which is connected to chassis common ground, and wherein an insulating portion of said electrically insulating housing of said telephone answering device covers said metallic member of said jack to render said metallic member of said jack inaccessible to contact by a user, thereby avoiding a risk of electrical shock to the user.

4. The telephone answering device of claim 1, further comprising a transformerless voice reception and transmission circuit for receiving and transmitting a voice signal, and which is coupled to the telephone line without using an isolating transformer.

5. The telephone answering device of claim 1, further comprising a transformerless low isolation line seizure circuit coupled to said telephone line, said line seizure circuit including a semiconductor switching device coupled to said controller, said semiconductor switching device being turned on responsive to an off hook control signal to thereby seize said telephone line.

6. The telephone answering device of claim 5, wherein said semiconductor switching device includes at least one transistor.

7. The telephone answering device of claim 1, further comprising a transformerless low isolation ring detect circuit coupled to said telephone line for sending an output signal to said controller responsive to detection of a ringing signal.

8. The telephone answering device of claim 7, wherein said transformerless low isolation ring detect circuit comprises a single transistor circuit which is operable for providing the output signal to said controller responsive to detection of the ringing signal on said telephone line.

9. The telephone answering device of claim 5, further comprising a transformerless low isolation line sense circuit coupled to said line seizure circuit for sensing an off hook condition of an extension telephone.

10. The telephone answering device of claim 9, wherein said line sense circuit includes a comparator for comparing an instantaneous telephone line voltage to a predetermined voltage for sensing said off hook condition.

11. The telephone answering device of claim 5, further comprising a transformerless load circuit coupled to said line seizure circuit for applying a load to said telephone line.

12. The telephone answering device of claim 11, wherein said transformerless load circuit comprises a transistor for applying a given impedance load for direct current, and for applying a second impedance load for audio signals.

13. A telephone answering device comprising:

a power source for supplying electrical power to the telephone answering device, said power source comprising at least a user-replaceable battery which is connectable with battery terminals in an electrically insulating housing of said telephone answering device, one of said battery terminals being connected to chassis common ground, and said battery terminals being located in a recess which is arranged within an interior portion of said electrically insulating housing;

a message recording and playback unit, in said electrically insulating housing, for recording a message and for playing back a message, said message recording and playback unit comprising a tape recorder unit;

a line interface circuit in said electrically insulating housing, with direct transformerless connection to a telephone line; and a controller, in said electrically insulating housing, for controlling said message recording and playback unit; and wherein said tape recorder unit comprises:

a tape head having a metal casing and a magnetic member in said metal casing;

a tape cassette receiving opening in said electrically insulating housing of said telephone answering device;

an openable lid for selectively permitting access to an interior of said tape cassette receiving opening; and a switch coupled between said metal casing of said tape head and chassis common ground, said switch being operatively coupled to said lid such that said switch is closed when said lid is in a closed position to connect said metal casing of said tape head to chassis common ground, and said switch is opened to interrupt the connection of said metal casing of said tape head to chassis common ground when said lid is in an open position to permit access to said tape cassette receiving opening.

14. The telephone answering device of claim 13, wherein said tape recorder unit further comprises dielectric means of sufficient magnitude between said metal casing of said tape head and said magnetic member for electrically isolating said magnetic member in said tape head from said metal casing of said tape head.

15. A telephone answering device comprising:

a power source for supplying electrical power to the telephone answering device;

a message recording and playback device for recording a message and for playing back a message, said message recording and playback means comprising a tape recorder unit;

a line interface circuit with a direct transformerless connection to a telephone line;

a controller for controlling said message recording and playback device;

wherein said tape recorder unit includes a tape head having a metal casing that is exposed to a user, and a magnetic member in said metal casing which is connected to chassis common ground, said tape head further comprises dielectric means of sufficient magnitude coupled between said metal casing and said magnetic member for electrically isolating said magnetic member in said tape head from said metal casing of said tape head; and a high resistance member coupling said metal casing of said tape head to chassis common ground.

16. The telephone answering device of claim 15, further comprising a transformerless voice reception and transmission circuit for receiving and transmitting a voice signal, and which is coupled to said telephone line without using an isolating transformer.

17. The telephone answering device of claim 15, further comprising a transformerless low isolation line seizure circuit coupled to said telephone line, said line seizure circuit including a semiconductor switching device coupled to said controller, said semiconductor switching device being turned on responsive to an off hook control signal to thereby seize said telephone line.

18. The telephone answering device of claim 17, wherein said semiconductor switching device includes at least one transistor.

19. The telephone answering device of claim 15, further comprising a transformerless low isolation ring detect circuit coupled to said telephone line for sending an output signal to said controller to said controller responsive to detection of a ringing signal.

20. The telephone answering device of claim 19, wherein said transformerless low isolation ring detect circuit comprises a single transistor circuit which is operable for providing the output signal to said controller responsive to detection of the ringing signal on said telephone line.

21. The telephone answering device of claim 17, further comprising a transformerless low isolation line sense circuit coupled to said line seizure circuit for sensing an off hook condition of an extension telephone.

22. The telephone answering device of claim 21, wherein said line sense circuit includes a comparator for comparing an instantaneous telephone line voltage to a predetermined voltage for sensing said off hook condition.

23. The telephone answering device of claim 17, further comprising a transformerless load circuit coupled to said line seizure circuit for applying a load to said telephone line.

24. The telephone answering device of claim 23, wherein said transformerless load circuit comprises a transistor for applying a given impedance load for direct current, and for applying a second impedance load for audio signals.

25. A telephone answering device comprising:

a power source for supplying electrical power to the telephone answering device;

a message recording and playback device for recording a message and for playing back a message;

a line interface circuit with a direct transformerless connection to a telephone line;

a controller for controlling said message recording and playback device; and an openable lid for selectively permitting access to exposed metallic members in an interior of said telephone answering device; and wherein said exposed metallic members in said interior of said telephone answering device are connected to chassis common ground through a switch, said switch being operatively coupled to said openable lid such that said switch is closed when said lid is in a closed position to connect said exposed metallic members to chassis common ground, and said switch is opened to interrupt the connection of said exposed metallic members to chassis common ground when said lid is in an open position.

26. The telephone answering device of claim 25, further comprising a transformerless voice reception and transmission circuit for receiving and transmitting a voice signal, and which is coupled to said telephone line without using an isolating transformer.

27. The telephone answering device of claim 25, further comprising a transformerless low isolation line seizure circuit coupled to said telephone line, said line seizure circuit including a semiconductor switching device coupled to said controller, said semiconductor switching device being turned on responsive to an off hook control signal to thereby seize said telephone line.

28. The telephone answering device of claim 27, wherein said semiconductor switching device includes at least one transistor.

29. The telephone answering device of claim 25, further comprising a transformerless low isolation ring detect circuit coupled to said telephone line for sending an output signal to said controller responsive to detection of a ringing signal.

30. The telephone answering device of claim 29, wherein said transformerless low isolation ring detect circuit comprises a single transistor circuit which is operable for providing the output signal to said controller responsive to detection of the ringing signal on said telephone line.

31. The telephone answering device of claim 27 further comprising a transformerless low isolation line sense circuit coupled to said line seizure circuit for sensing an off hook condition of an extension telephone.

32. The telephone answering device of claim 31, wherein said line sense circuit includes a comparator for comparing an instantaneous telephone line voltage to a predetermined voltage for sensing said off hook condition.

33. The telephone answering device of claim 27, further comprising a transformerless load circuit coupled to said line seizure circuit for applying a load to said telephone line.

34. The telephone answering device of claim 33, wherein said transformerless load circuit comprises a transistor for applying a given impedance load for direct current, and for applying a second impedance load for audio signals.

35. The telephone answering device of claim 25, wherein said message recording and playback device comprises a tape recorder unit, and wherein said tape recorder unit comprises:

a tape head having a metal casing and a magnetic member in said metal casing;

a tape cassette receiving opening in a housing of said telephone answering device; and the openable lid for selectively permitting access to an interior of said tape cassette receiving opening; and wherein said switch is coupled between said metal casing of said tape head and chassis common ground, said switch being operatively coupled to said lid such that said switch is closed when said lid is in a closed position to connect said metal casing to chassis common ground, and said switch is opened to interrupt the connection of said metal casing to chassis common ground when said lid is in an open position to permit access to said tape cassette receiving opening.

36. The telephone answering device of claim 35, further including dielectric means of sufficient magnitude between said metal casing and said magnetic member for electrically isolating said magnetic member in said metal casing of said tape head from said metal casing of said tape head.

37. The telephone answering device of claim 36, further comprising a high resistance member coupling said metal casing of said tape head to chassis common ground.

* * * * *